United States Patent [19]
Zimmerman

[11] 3,758,854
[45] Sept. 11, 1973

[54] SUPERCONDUCTIVE QUANTUM INTERFERENCE DEVICE HAVING TWO CAVITIES ISOLATED BY A SUPERCONDUCTIVE WEAK LINK

[76] Inventor: James E. Zimmerman, 404 Hapgood Ave., Boulder, Colo. 80302

[22] Filed: Mar. 12, 1971

(Under Rule 47)

[21] Appl. No.: 123,686

[52] U.S. Cl. .......... 324/43 R, 128/2.06 E, 307/306, 338/32 S
[51] Int. Cl. .................................. G01r 33/02
[58] Field of Search ................. 324/43 R; 335/216; 307/306; 338/32 SC; 336/250; 128/2.1 R, 2.06 E, DIG. 4

[56] References Cited
UNITED STATES PATENTS

| | | | |
|---|---|---|---|
| 3,244,943 | 4/1966 | Hildebrandt | 335/216 |
| 3,262,025 | 7/1966 | Hildebrandt et al. | 335/216 |
| 3,386,050 | 5/1968 | Dayem et al. | 324/43 R |
| 3,528,005 | 9/1970 | Morse et al. | 324/43 R |

OTHER PUBLICATIONS

Zimmerman et al., Design & Operation....Contacts, Journal of App. Phys., Vol. 41, No. 4, pp. 1,572–1,580, Mar. 15, 1970

Primary Examiner—Robert J. Corcoran
Attorney—Herbert Epstein

[57] ABSTRACT

A symmetric superconductive quantum interference device (SQUID) for use in magnetic field, or radio frequency energy, sensing systems. The symmetric SQUID comprises a solid niobium cylinder with a dumbbell shaped hole formed longitudinally therethrough. A pair of niobium screws, one having a flat end and the other having a pointed end, are positioned in the cylinder normal to its longitudinal axis so as to contact and form a weak superconductive link in the narrow portion of the dumbbell shaped hole. The symmetric SQUID exhibits the quantum interference effect in response to a difference in magnetic field strength between its two holes (i.e. the two circular portions of the dumbbell shaped hole). Thus the device will respond directly to a magnetic field gradient, but not to a uniform magnetic field.

Response to a uniform magnetic field can be achieved by inductively coupling a flux transformer to one hole of the device, so that in the presence of an applied field, flux shifts from one hole of the device to the other. Magnetic field gradients can be sensed by inductively coupling a gradient-sensitive flux transformer to one hole of the SQUID. The gradient sensitive flux transformer may comprise a pair of superconductive loops each formed by a thin niobium sheet wrapped around a quartz tube.

In another embodiment of the invention, suitable for making sensitive temperature measurements, cerous magnesium nitrate (CMN) powder is inserted into one hole of the symmetric SQUID. The SQUID is then cooled to its superconductive state in the presence of a magnetic field and then the field is removed. A change in temperature causes the susceptance of the CMN powder to change, thereby shifting magnetic flux lines from one hole of the device to the other. This shifting of flux causes a change in the impedance of the SQUID. This change can be measured to ascertain the temperature change.

12 Claims, 20 Drawing Figures

INVENTOR.
JAMES E. ZIMMERMAN

INVENTOR.
JAMES E. ZIMMERMAN

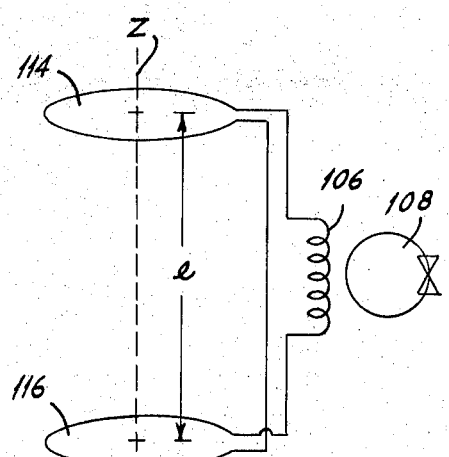
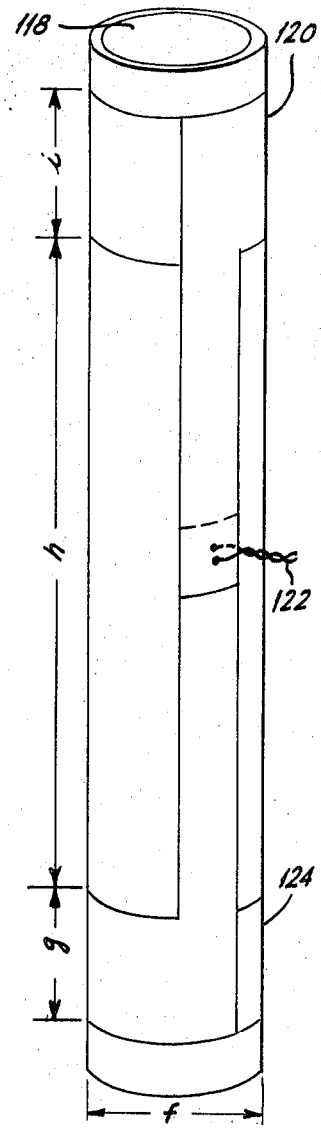
FIG. 13.
FIG. 14A.
FIG. 14.
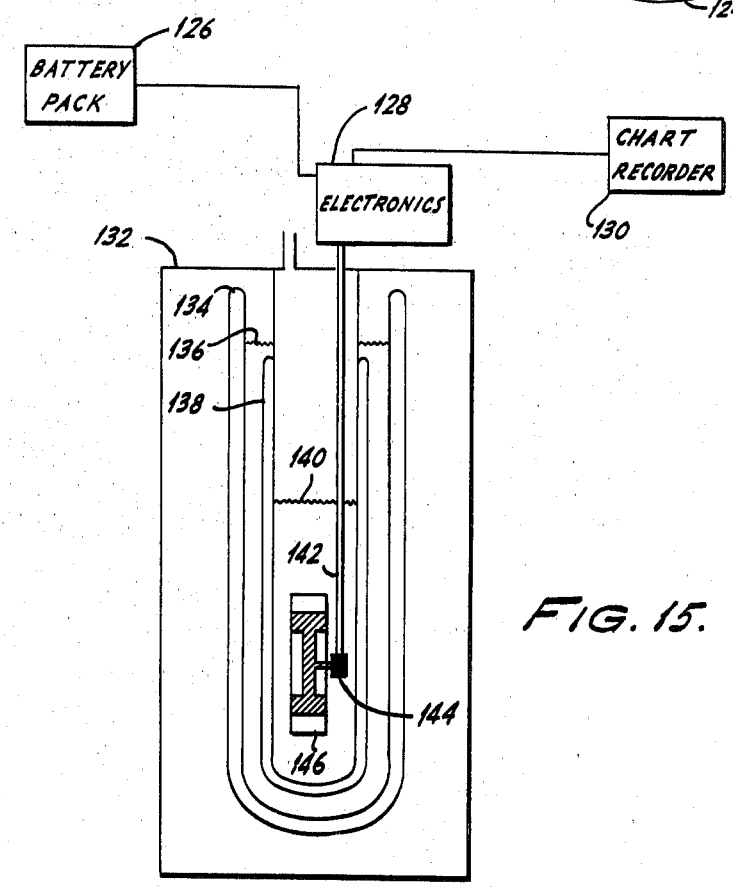
FIG. 15.
INVENTOR.
JAMES E. ZIMMERMAN

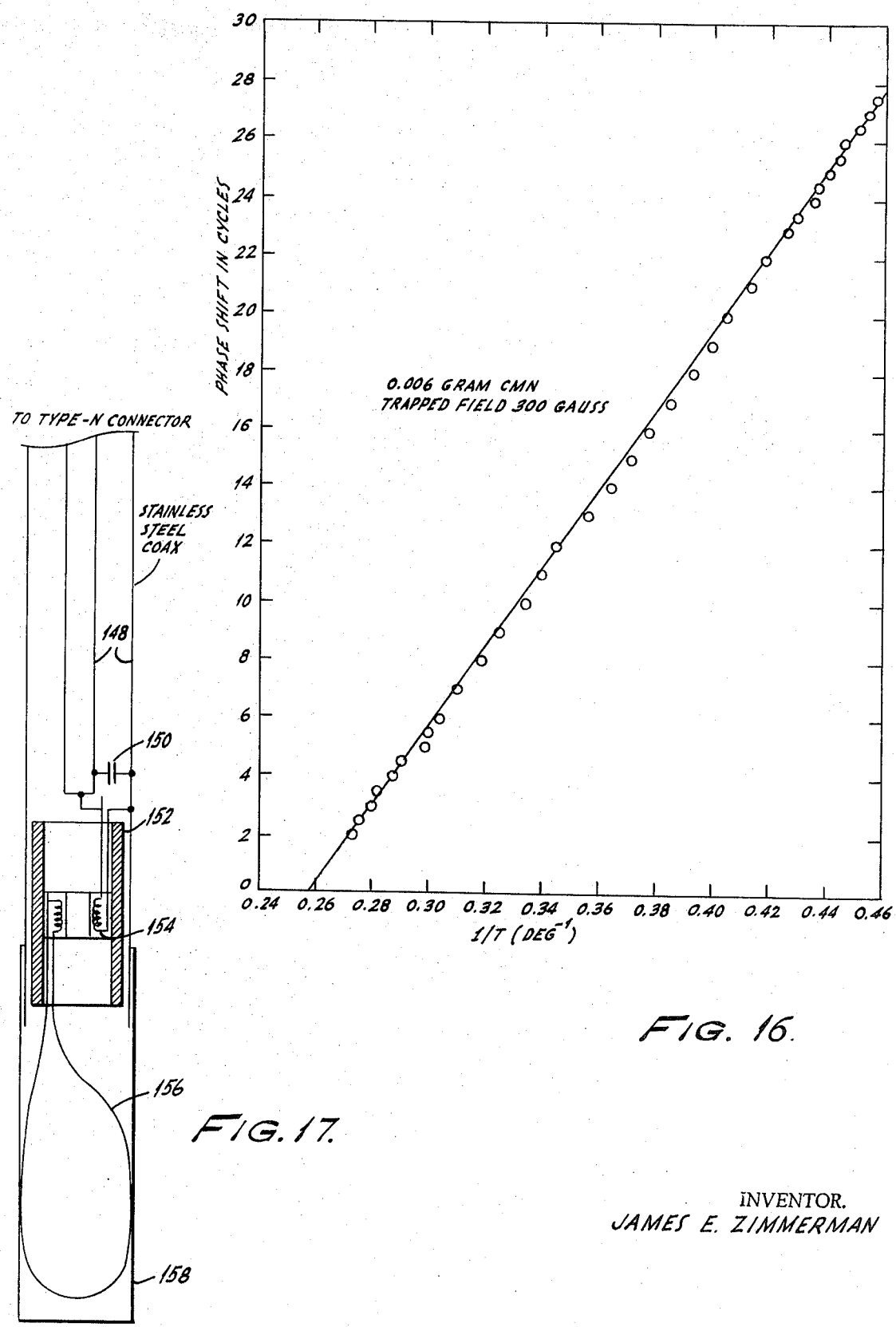

SUPERCONDUCTIVE QUANTUM INTERFERENCE DEVICE HAVING TWO CAVITIES ISOLATED BY A SUPERCONDUCTIVE WEAK LINK

BACKGROUND OF THE INVENTION

The invention herein described was made in the course of or under a contract or subcontract thereunder, with the Advanced Research Projects Agency, Washington, D. C.

The invention relates to an improved superconductive quantum interference device (SQUID).

The SQUID is a low-temperature circuit element capable of exhibiting periodic variations in its electrical characteristics as a function of applied magnetic field or drive current. These devices can be used for detection of magnetic fields or generation of electromagnetic fields, or as a non-linear circuit element for detection or mixing of R.F. signals.

SQUIDS comprise superconductive structures separated by a weak superconductive link. The weak link may be formed by positioning a very thin insulating layer between two superconductive structures or by point-contacting one of the superconductive structures to a flat surface of another of the superconductive structures. Point contacts formed by using a pair of superconductive screws, one having a pointed end and the other having a flat end are especially useful because the pressure of the contact, on which electrical properties of the device depend, can be easily adjusted.

Prior-art point contact devices have proved to be unreliable and unstable because of the sensitivity of the electrical characteristics of the device (particularly the critical current) to the mechanical characteristics of the point contact. (By "critical current" is meant that current at and above which the device behaves as a normal conductor as contrasted to a superconductor). The mechanical characteristics are adversely affected by atmospheric oxidation or corrosion of the contact, deformation of the contact by differential thermal expansion or contraction of the supporting structure due to recycling of the device between room temperature and the cryogenic temperature at which superconductivity is achieved (typically near 4°K), and deformation of the contact by mechanical vibration of the supporting structure.

Magnetometers and gradiometers incorporating prior-art SQUIDS as magnetic field detectors have been undesireably insensitive. Commercially available devices have exhibited sensitivities of the order of only $10^{-7}$ gauss. The limitation of sensitivity of the prior-art devices is due to the effect of anomolies in the ambient magnetic field, variations in the ambient magnetic field due to electronic circuit instabilities (e.g. drift in line voltage or component parameters), and noise introduced by the proximity of conducting bodies to the measuring device.

Accordingly an object of this invention is to provide an improved SQUID.

Another object is to provide a SQUID which is insensitive to thermal cycling.

Another object is to provide a SQUID which is insensitive to mechanical shock.

Another object is to provide a SQUID with increased sensitivity to magnetic fields.

Another object is to provide a SQUID and flux transformer combination with increased sensitivity to magnetic fields.

Another object is to provide a SQUID and flux transformer combination with increased sensitivity to magnetic field gradients.

Another object is to provide a SQUID system capable of sensitive temperature measurement.

Another object is to provide an improved method for measurement of temperature.

DRAWINGS OF THE INVENTION

FIG. 13 is a spatial schematic diagram of that gradient-sensitive flux transformer.

FIG. 14 is a more structural diagram of that transformer, and FIG. 14A depicts superconductive loops forming part of that transformer.

FIG. 15 is a block diagram of an apparatus comprising the symmetric SQUID, used to make field measurements of a magnetic field gradient.

FIG. 16 depicts the phase-shift versus inverted temperature characteristic for a symmetric SQUID according to the invention having temperature-sensitive magnetic material inserted therein.

FIG. 17 shows the arrangement of the symmetric SQUID and a flux transformer in the lower half of a probe used in magnetocardiography.

DESCRIPTION OF THE SYMMETRIC SQUID

Figure 1:
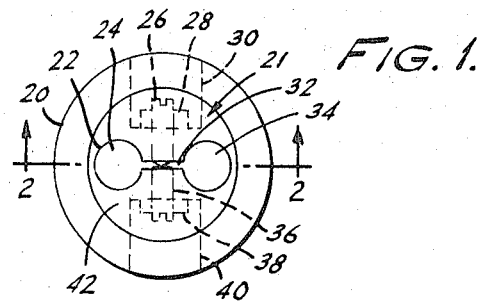
FIG. 1 is an end view of a symmetrical SQUID according to the invention.
Figure 2:
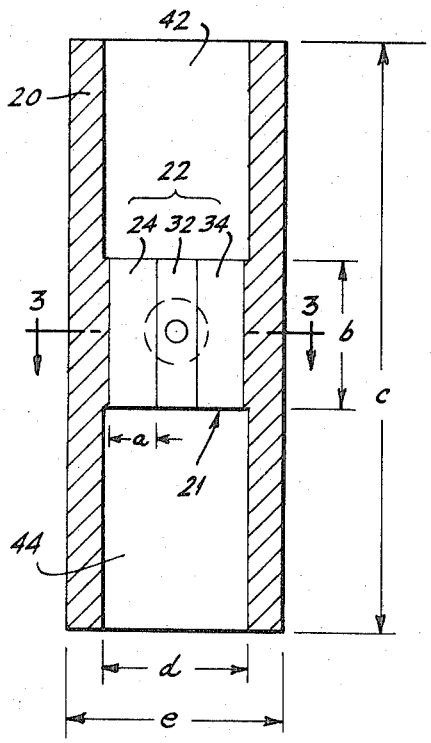
FIGS. 2 and 3 are sectional views of said symmetrical SQUID.
Figure 3:
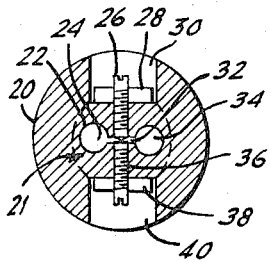

The symmetric SQUID of the invention is shown in FIGS. 1, 2, and 3.

The SQUID comprises cylindrical body 20, which is composed of the superconductive material niobium. Body 20, otherwise tubular, contains a solid central portion 21 within which is longitudinally disposed a dumbbell shaped hole 22 comprising circular portions 24 and 34 and narrow connecting portion 32. A weak superconductive link is formed by niobium screws 26 and 36, which are coaxially mounted in threaded holes drilled and tapped transversely across the center of portion 21 and which contact in opposing relationship the narrow connecting portion 32 of dumbbell shaped hole 22. Screw 26 has a pointed end which may be formed on a jeweler's lathe and honed to microscopic sharpness. Screw 36 has a flat end which is contacted by the pointed end of screw 26 to form the weak link. When the screws are adjusted to yield desired contact pressure, they may be locked into place by niobium nuts 28 and 38 which fit into slots 30 and 40 formed in cylindrical body 20. Holes 42 and 44, which are formed in cylindrical body 20, allow magnetic shielding of the point contact formed in dumbbell shaped hole 22 by providing superconductive structure (i.e. the walls of cylindrical body 20) extending beyond the depth of the dumbbell shaped hole. Where such shielding is not desired, e.g. in certain gradiometers, the walls of cylindrical body 20 may be coextensive with the sides of portion 21 and, i.e. dimension $c$ equal to and coincident with dimension $b$.

Examplary device dimensions and screw sizes are listed in the following tabulation (Table I). However devices having different dimensions and screw sizes can also be used.

TABLE I

| Device Dimension | Size |
|---|---|
| a | 0.080" |
| b | 5/16" |
| c | 1" |
| d | ¼" |
| e | ⅜" |
| Screw | |
| 26 | 000–120 |
| 36 | 000–120 |

The device of the invention is inherently highly shock resistant because of its shape. The two opposing members of the point contact, screws 26 and 36, are held in precise relative position by the rigid symmetrical double bridge structure formed by body portion 21 and dumbbell shaped hole 22. The screws themselves are isolated from direct mechanical shock by being recessed within slots 30 and 40.

Since the electrical characteristics of the SQUID are a sensitive function of point contact pressure, the mechanical rigidity of the device of the invention results in stable electrical operation. Experimentally it has been determined that transverse compressive forces in excess of 1 kilogram, applied to the sides of body 20, result in no measureable effect on the contact.

Another cause of instability in point contact SQUIDS is thermal deformation of the point-contact due to cycling between room temperature and the cryogenic temperature (about 4.2°K for niobium) at which superconductivity takes place. The device of the invention is inherently resistant to thermal deformation because all of the structures which form and support the point contact (viz., body 20, screws 26 and 36, and nuts 28 and 38) are composed of the same superconductive material, viz., niobium, and therefore have the same thermal expansion characteristics. This fact has been proven experimentally by repeated temperature cycling of such devices. One device has been cycled between 300°K and 4.2°K 60 times with no apparent change of critical current or other characteristics.

Although the superconductive material used in the preferred embodiment of the invention is niobium, other superconductive materials such as vanadium, or tantalum can be used, so long as all structures forming and supporting the point contact are composed of the same material.

RESPONSE OF SYMMETRICAL SQUID TO APPLIED MAGNETIC FIELDS

The usefulness of a SQUID as a circuit element is based on its capability of exhibiting the so-called quantum interference effect — i.e. when cooled to the temperature at which it becomes a superconductor, the device exhibits periodic variations in its electrical characteristics as a function of applied magnetic field or drive current. However, due to its particular shape, the symmetric SQUID of the invention differs from prior-art SQUIDS in its response to applied magnetic fields in that it does not respond to magnetic fields, whether constant or time-varying, whose value at any instant is the same in both holes thereof. Instead, the symmetric SQUID exhibits the quantum interference effect in response to a difference in magnetic field strength between its two holes. This difference may be brought about by applying a magnetic field gradient (i.e. a field which varies spatially) directly to the device or by causing flux to shift from one hole to the other (e.g. by inserting a flux sensing coil in one of the holes).

The symmetric SQUID has these unique properties because it is functionally equivalent to two superconducting rings (formed by the niobium bounding holes 24 and 34) connected in parallel with a common weak link (formed in narrow connecting portion 32 by screws 26 and 36). When the symmetric SQUID is above its superconductive temperature, its niobium body acts as a normal non-magnetic metal and passes magnetic flux lines without distortion of those lines. However, when the device is cooled below its superconductive temperature in the presence of a uniform magnetic field directed through the holes the number of flux-lines trapped in holes 24 and 34 by the cooling will be equal (because the device has a symmetrical structure) and hence no difference in field strength will exist across the weak link. A difference in field strength can be applied across the weak link by inserting a coil into one of the holes of the device and supplying R.F. energy to that coil. The electromagnetic field surrounding the coil will increase the flux in that hole and create a flux difference across the weak link. An alternate way of creating the flux difference is by use of a flux transformer which comprises a superconductive wire shaped at one end into a loop for sensing an external magnetic field and shaped at the other end into a coil which is inserted into one of the holes of the SQUID for supplying flux from that field to that hole. In either case, when the resulting differential field reaches a value defined as the critical value the weak link behaves as a normal conductor, exhibiting appreciable electrical impedance between screws 26 and 36. When the link becomes normally conducting, the flux redistributes itself across the link so as to eliminate the flux difference. Once the flux difference is eliminated, the weak link again returns to its superconductive state (wherein it again exhibits no appreciable electrical impedance between screws 26 and 36) until a further flux application again creates a differential flux. Further successive applications of flux cycle the weak link through corresponding successive states of normal conductivity and superconductivity which are manifested in the aforementioned changes in the impedance between screws 26 and 36. This cyclical change in impedance can be used to measure external fields.

To facilitate the explanation of the operation of the symmetric SQUID of the invention, brief reference now is made to the behavior of a single superconductive ring when cooled in a uniform magnetic field. The behavior of a superconductive ring in a magnetic field can be explained by the theory of Meissner currents. This theory postulates that, as a body of superconductive material of any shape is cooled from above the superconductive temperature to below that temperature, while the body is within a uniform magnetic field, circulating electric currents will appear on the surfaces of that body.

These surface or Meissner currents are of such magnitude and are so positioned as to create an opposing magnetic field that exactly balances the applied field and in effect cancels or expels it from the superconductive material. In the case of a tubular body having an inner surface and an outer surface, e.g. a ring, two Meissner currents appear, one on the inner surface, the other on the outer surface. The Meissner current on the inner surface of the ring effectively "pushes" the flux into the ring's interior while the Meissner current on the outer surface of the ring pushes the flux away from the outer surface. When the applied magnetic field is removed from the ring (the temperature of the ring being below the superconduction temperature) the outer surface current disappears but the inner surface current remains, thereby trapping the flux inside the ring until the superconductive material is driven into normal conduction by application of a large external field or is allowed to become normally conductive by permitting it to warm to a temperature above the superconduction temperature.

In contrast, in the case of the symmetric SQUID cooled in the presence of a uniform field, there is no Meissner current in the weak link because the Meissner currents in the two internal rings (holes 24 and 34) are equal and in the same direction (e.g. both clockwise), and therefore cancel each other in the weak link. When the field difference across the weak link is introduced, the Meissner current in the weak link increases until it reaches the critical current value for which the link goes out of superconduction and into normal conduction, i.e. the "normal state". At that point the flux redistributes itself, thereby decreasing the Meissner current below the critical value so that the link again returns to its superconducting state.

Since the two superconducting rings formed by holes 24 and 34 are surrounded by the relatively massive superconducting ring formed by cylindrical body 20, ordinarily encountered fields which are sufficiently strong to drive the weak link into normal conduction when sensed by a flux transformer will not be sufficiently strong to drive the entire structure into the normal state. Thus the symmetric SQUID will be effectively shielded from external uniform fields and thereby the sensitivity of field measuring devices using the symmetric SQUID is greatly enhanced.

While the advantageous properties of the symmetrical SQUID are achieved in the preferred embodiment of the invention by a device comprising a cylindrical body and a dumbbell shaped hole it will be apparent to those skilled in the art that other body and hole shapes can be used so long as symmetry about the weak link is maintained.

ELECTRICAL CHARACTERISTICS

In an external magnetic field the symmetric SQUID exhibits the electrical characteristics of a superconductive ring having a weak superconductive link. The latter device is useful as a magnetic flux detector because critical current of the device, when within a magnetic field, varies periodically, the period being dependent on the amount of flux threading the superconductive ring. By electrically biasing the device within the range of critical currents which result from the range of expected variations in magnetic field, the device will be caused to go through successive periods of normality and superconductivity as a function of external field. The bias current can be supplied by making direct contact with the SQUID or by inductively coupling a radiofrequency (R.F.) bias signal to the SQUID by inserting a coil driven by an R.F. generator into one of the holes. As the external field is varied, the excursions between superconductivity and normality will cause the device to exhibit a periodic variation in impedance and voltage drop between screws 26 and 36. By sensing this voltage or by using it to generate another magnetic field to cancel out the external field in the ring, a measure of the external field can be obtained.

The mechanism of R.F. biased superconductive rings which contain a weak link, their characteristics, and methods for using such devices for measurement of magnetic fields are discussed fully in the publication, "Quantum States and Transitions in Weakly Connected Superconducting Rings", by A. H. Silver and J. E. Zimmerman, *The Physical Review*, Vol. 157, No. 2, pages 317–341, May 10, 1967. Hence no further discussion thereof is necessary herein.

Figure 4:
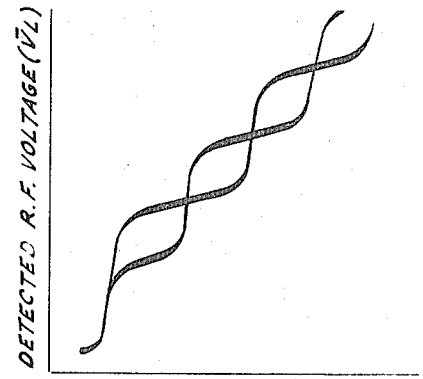
FIG. 4 is a picture of a measured radio-frequency (R.F.) voltage-R.F. current (V-I) characteristic of said symmetrical SQUID.
Figure 5:
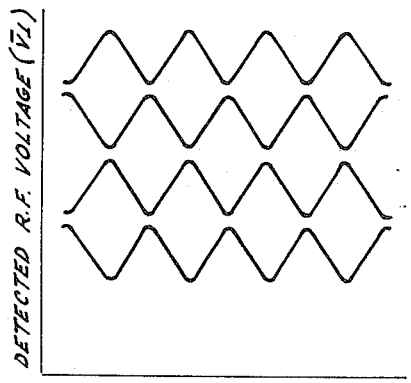
FIG. 5 is a picture of R.F. voltage − D.C. magnetic field characteristics of said symmetrical SQUID.

FIGS. 4 and 5 are pictures of the electrical characteristics of the symmetrical SQUID of the invention as displayed by a cathode-ray oscilloscope. FIG. 4 shows the V-I characteristic of the device, i.e. detected R.F. voltage across the device versus the amplitude of R.F. drive (or bias) current. The bias current was applied by the aforementioned method of inductive coupling, using a 30 MHz bias signal. The variation in amplitude of the bias signal, depicted along the abscissa of FIG. 4, was obtained by amplitude modulating the R.F. drive signal with an audio frequency signal. The V-I curve oscillates between two extremes as a function of D.C. applied field. The oscillation is shown directly in FIG. 5, in which the four respective curves are plots of the detected R.F. voltage as a function of D.C. field strength, for four different fixed amplitudes of R.F. drive current. In this measurement the D.C. field is varied by driving the inductive coupling coil with an audio signal. Each trace in FIG. 5 corresponds to a loop in FIG. 4 at the same detected R.F. voltage level. The phase reversal between successive traces in FIG. 5 corresponds directly with the successive cross-overs of the two traces of FIG. 4.

Figure 6:
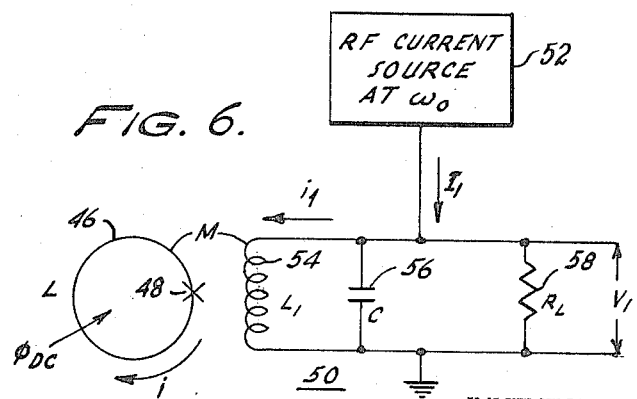
FIG. 6 is a schematic diagram of a point contact superconductive ring coupled to a resonant circuit.

The reasons for the electrical characteristics shown in FIGS. 4 and 5 will be understood better from the following analysis of the operation of the circuit shown schematically in FIG. 6. The circuit of FIG. 6 comprises a superconductive ring 46, having a point contact 48.

The self inductance of the superconducting ring is designated L. Ring 46 is inductively coupled to the inductor 54 of a resonant (or tank) circuit 50. The mutual inductance of this coupling is designated M. Resonant circuit 50 comprises the parallel combination of inductor 54, having inductance $L_1$, a capacitor 56 having capacitance C, and a load resistor 58 having resistance $R_L$.

The behavior of the superconductive ring in a magnetic field is similar to the behavior of the symmetric SQUID of the invention, except that the ring responds directly (i.e. without need of a flux transformer) to a uniform magnetic field. Tank circuit 50 represents the equivalent circuit of all external measuring circuitry which is inductively coupled to the ring. Inductor 54 represents the self inductance of a coil which is inserted in the ring (or SQUID), and capacitor 56 and resistor 58 respectively represent the total capacitance and resistance connected across the coil. Circuit 50 is driven by a source 52 of R.F. current having a frequency $\omega_o$.

Figure 7:
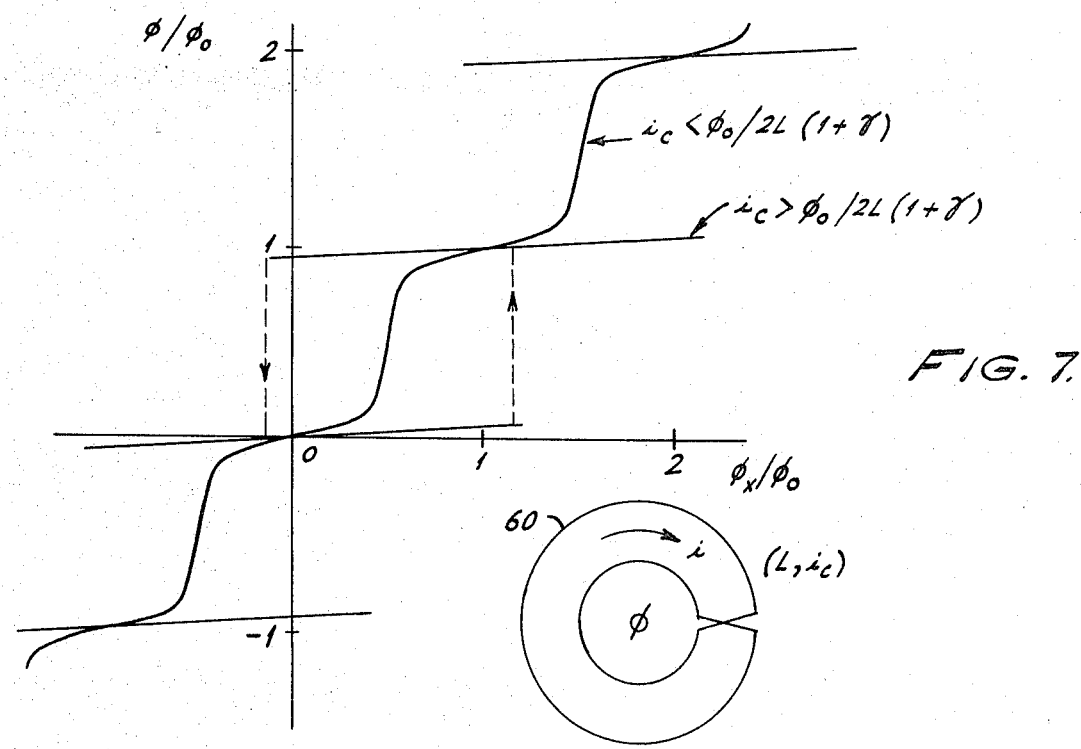
FIG. 7 is a graph of the ratio of the total static flux enclosed in a point-contact superconductive ring to a quantum of magnetic flux as a function of the ratio of the external magnetic flux enclosed by the ring to a quantum of magnetic flux.

In the aforementioned paper by Silver and Zimmerman, the authors showed that the dynamic behavior of the device can be derived from a quantum-periodic magnetic response function shown in FIG. 7, which is either continuous and reversible or discontinuous and hysteretic, depending upon whether the critical current, $i_c$, of the point contact is less than or greater than $\phi_x/2L(1 + \gamma)$. In FIG. 7, the ratio $\phi/\phi o$ is plotted as a function of the ratio $\phi_x/\phi o$, where $\phi$ is the total static flux, $\phi_x$ is the externally applied flux, and $\phi o$ represents the smallest unit of magnetic flux, 1 quantum, numerically equal to $h/2e$, where $h$ is Planck's constant and $e$ is the charge on an electron. $\gamma$ is a dimensionless parameter dependent on the inductance of the ring and the size of the weak link. In practical devices $\gamma$ is small compared to unity. For $i_c$ slightly greater than $\phi_x/2L(1 + \gamma)$, transitions between the disconnected states shown in FIG. 7 obey a selection rule $\Delta n = \pm 1$; that is, transitions take place only between adjacent states. Where $i_c$ is greater than $\phi_x/2L (1 + \gamma)$ and where the R.F. bias frequency $\omega_o$ is set equal to the low-level resonant frequency of system, the device is equivalent to a shorted turn in the field of the coil 54. Therefore $\omega_o$ is higher than the resonant frequency of the tank circuit in the absence of the device, or with the contact open, or at high bias levels. The R.F. voltage $V_1$ across the tank circuit is a linear function of the R.F. bias current $I_1$ into the tank circuit as long as the total peak current in the superconducting loop is less than $i_c$. For the case where the external applied field is D.C., and:

$\phi_x = \phi_{dc} = 0$ (or $n\phi_o$), the critical current $i_c$ is reached at the flux level (taking $\gamma \approx 0$):

$$\phi_c = L i_c .$$

The R.F. flux $\phi_1$ applied to the device via the R.F. bias current is:

$$\phi_1 = M i_1 = V_1 M/\omega_o L_1$$

where $i_1$ is the current in tank coil 54. Hence $$\phi_1 = \phi_c \text{ when } V_1 M/\omega_o L_1 = L i_c .$$

Denoting this value of $V_1$ as $V_{1c}$, and the corresponding value of $I_1$ as $I_{1c}$, we have:

$$V_{1c} = \omega_o L_1 L i_c/M = I_{1c} R_L$$

(1)

Figure 8:
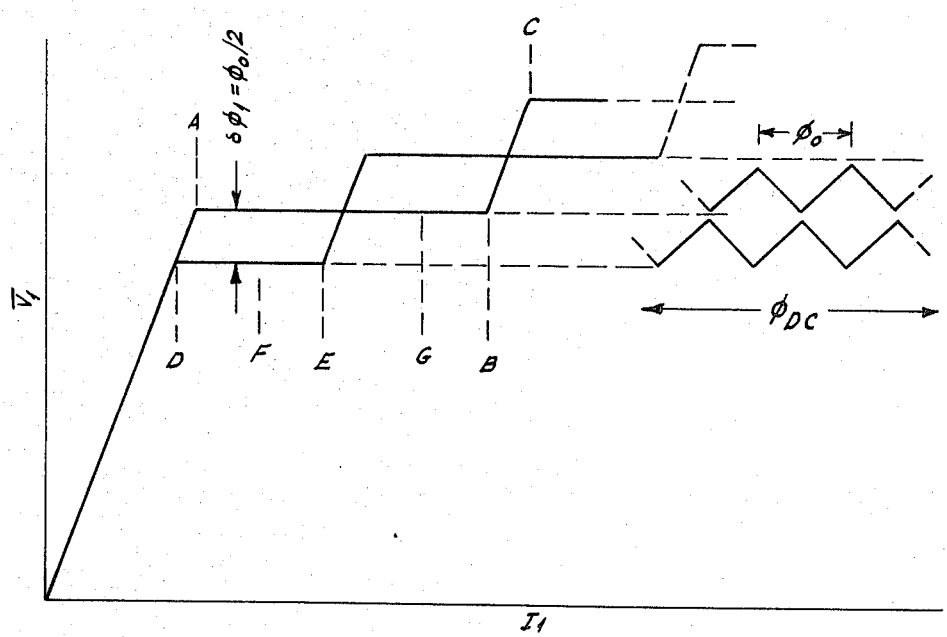
FIG. 8 depicts the theoretically-predicted R.F. voltage of a point contact superconductive ring plotted as a function of R.F. current through the contact and of static magnetic field through the ring.

The expected R.F. voltage amplitude $V_1$ as a function of R.F. current $I_1$ and of external static field $\phi$ D.C. is shown in FIG. 8. At the bias level of equation 1, viz., $V_{1c}$, $I_{1c}$, (FIG. 8, point A) a transition to one of the two adjacent states and back takes place. Thus, the tank circuit energy is abruptly reduced by the area of one hysteresis loop, that is $$\Delta E = 2 \phi_o i_c - \phi_o^2 / L$$

(2)

This is equivalent to shock-exciting the tank out-of-phase with the driven oscillation. No further transitions can take place until the shock excitation dies out, that is, until the oscillation level again builds up to the critical level. Consequently, the system undergoes a low-frequency, low-ambient saw-tooth modulation in time. As the bias current $I_1$ is further increased above the critical value, the buildup of the oscillation level $V_1$ is more rapid and the saw-tooth modulation frequency increases. However, the modulation amplitude and the average oscillation level $\overline{V}_1$ remain fixed, the former being proportional to $\Delta E$ and the latter being essentially equal to $V_{1c}$ minus half the modulation amplitude. Both $\Delta E$ and $V_{1c}$ are fixed parameters of the system. Thus $\overline{V}_1$ is limited at this level until two hysteresis loops, one above and one below the D.C. field level $\phi_{dc}$ are traversed on every R.F. cycle. At this point (FIG. 8, point B), $\overline{V}_1$ again increases until the second pair of hysteresis loops is encountered, at which point (FIG. 8, point C) $\overline{V}_1$ is again limited by the mechanism described above. The total response may be described as a linear rise in $\overline{V}_1$ interrupted by an equally-spaced series of plateaus.

Similarly, if $\phi_{dc}/\phi 0$ is an odd half-integer, $$\phi_{dc} = (n + \tfrac{1}{2})\phi_o,$$

then the first plateau comes near:

$$V_{1(crit)} = \omega_o (L i_c - \phi_o/2) L_1/M.$$

(3)

In this case, limiting is effected by one hysteresis loop rather than two, so the first plateau (FIG. 8, points D to E) is half as long as succeeding ones.

Finally, it can be shown by extension of these arguments that for a particular R.F. bias level (FIG. 8, point F, for example), $\overline{V}_1$ increases linearly in the regions $(n - \tfrac{1}{2}) < \phi_{dc}/\phi_o < (n + \tfrac{1}{2})$ and decreases linearly in the regions $(n - \tfrac{1}{2}) < \phi_{dc}/\phi_o < n$. That is, the response as a function of D.C. field is a triangular wave. Furthermore, the wave reverses phase as the R.F. level is increased so as to encompass the next adjacent pair of hysteresis loops, or so that the R.F. flux amplitude at the superconducting loop increases by $\phi_o/2$ (FIG. 8, point G).

This theory is valid only if the tank circuit has a fairly high Q, and the mutual inductance M is large enough that the inherent energy loss per cycle, $2 \pi V_1 \, 2/\omega_o R_L$, is considerably smaller than the area of a hysteresis loop.

The experimental results shown in FIGS. 4 and 5 are typical of patterns obtained with symmetrical SQUIDS of the type shown in FIGS. 1–3, with a tank circuit Q of about 100, $M/\sqrt{LL_1} \approx 0.05$, $L \approx 4 \times 10^{-10}$ h, an overall system bandwidth of $10^5$ Hz, a tank circuit capacitance $C \approx 2 \times 10^{-10}$ farad, and $\omega_o = 30$ MHz. The tank coil, a 10-turn coil of No. 38 copper (about 1½ mm O.D.) was inserted directly in one hole of the device.

Figure 9:
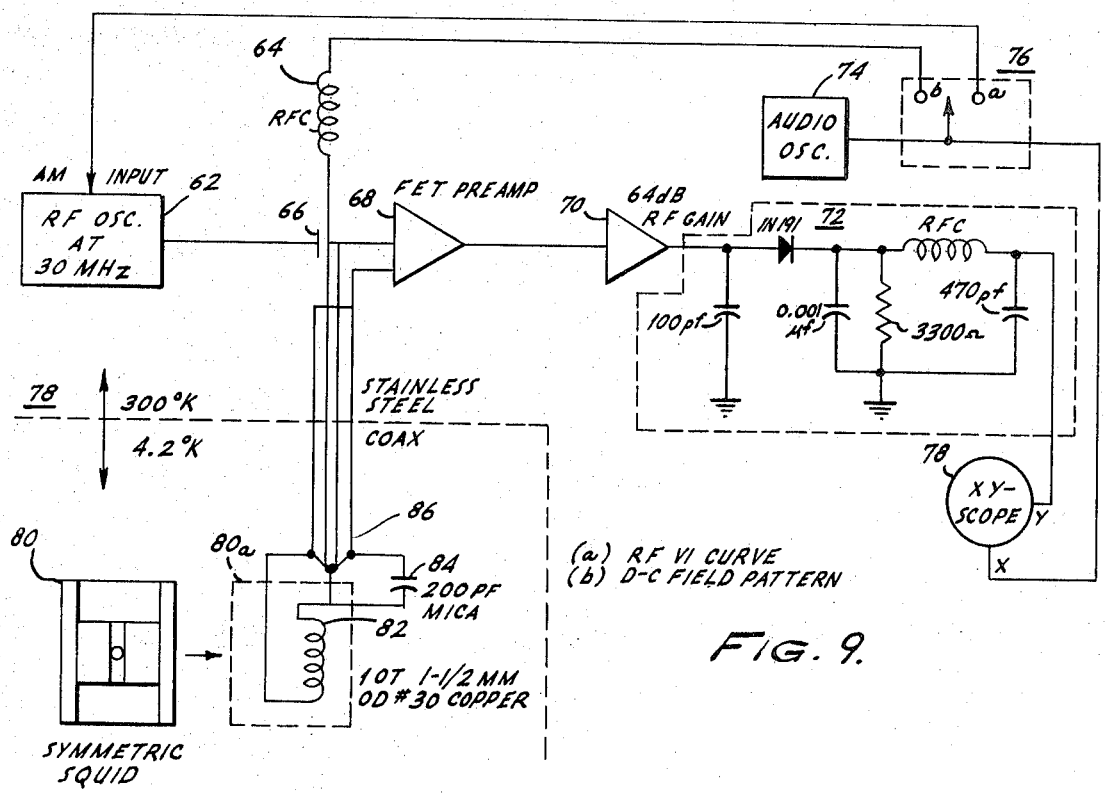
FIG. 9 is a block diagram of the apparatus used to measure the electrical characteristics of a SQUID.

The experimental results shown in FIGS. 4 and 5 were obtained with the apparatus shown in FIG. 9. In this apparatus the cryogenic portion, which is cooled to 4.2°K, is shown within outline 78. This portion of the apparatus is connected to the external measuring circuitry, at room temperature, by coaxial cable 86. The tank circuit inductance $L_1$ is supplied by coil 82 which is inserted directly into one hole, represented schematically by dotted outline 80a, of symmetric SQUID 80. Tank circuit capacitor 84 is connected in parallel with coil 82. The parallel combination of coil 82 and capacitor 84 is connected by coaxial cable 86 to the input of preamplifier 68 where the signal existing in the tank circuit is amplified by low noise amplifiers. The tank circuit which comprises coil 82, capacitor 84 and the input impedance to preamplifier 68, is tuned to 30 MHz. Preamplifier 68 is connected to amplifier 70 where the 30 MHz signal is further amplified. Amplifier 70 is connected to detector and filter circuit 72 where any amplitude modulation present in the 30 MHz signal is detected. The output of circuit 72 is representative of the amplitude of the 30 MHz carrier signal. Circuit 72 is connected to the Y (or vertical) plates of XY-scope 78 where the amplitude of the 30 MHz signal existing across the tank circuit is displayed. Oscillator 62, which supplies the 30 MHz signal used for biasing the SQUID, is connected to coaxial cable 86 by "loose" capacitive coupling 66. The loose coupling provides a high impedance connection to the tank circuit which assures that the bias current is supplied from a constant current source (i.e. so that the bias level will not be a function of tank circuit impedance). Audio oscillator 74 is connected by switch 76 to either oscillator 62 (position a) or choke 64 (position b). When the V-I characteristic (FIG. 4) is to be measured, switch 76 is thrown to position a, and the audio signal is used to amplitude modulate the output of oscillator 62. This, in effect, varies the bias current supplied to the SQUID. Audio oscillator 74 is also connected across the X (or horizontal) axis of XY scope 78. Thus when switch 76 is connected in position a, the variation in the amplitude of the SQUID bias current is displayed on the X-axis on the face of scope 78 and the variation in voltage across the tank circuit is displayed across the Y-axis (as shown in FIG. 4). When the field characteristic (FIG. 5) is to be measured, switch 76 is thrown to position b, and the audio signal, which is applied via choke 64 and coaxial cable 86 to coil 82, is used to vary the field strength in the SQUID. In this manner, the variation in field strength is displayed on the X-axis on the face of scope 78 and the variation in voltage across the tank circuit is displayed across the Y-axis (as shown in FIG. 5).

USE OF THE SYMMETRIC SQUID AS A MAGNETOMETER AND GRADIOMETER

Figure 10:
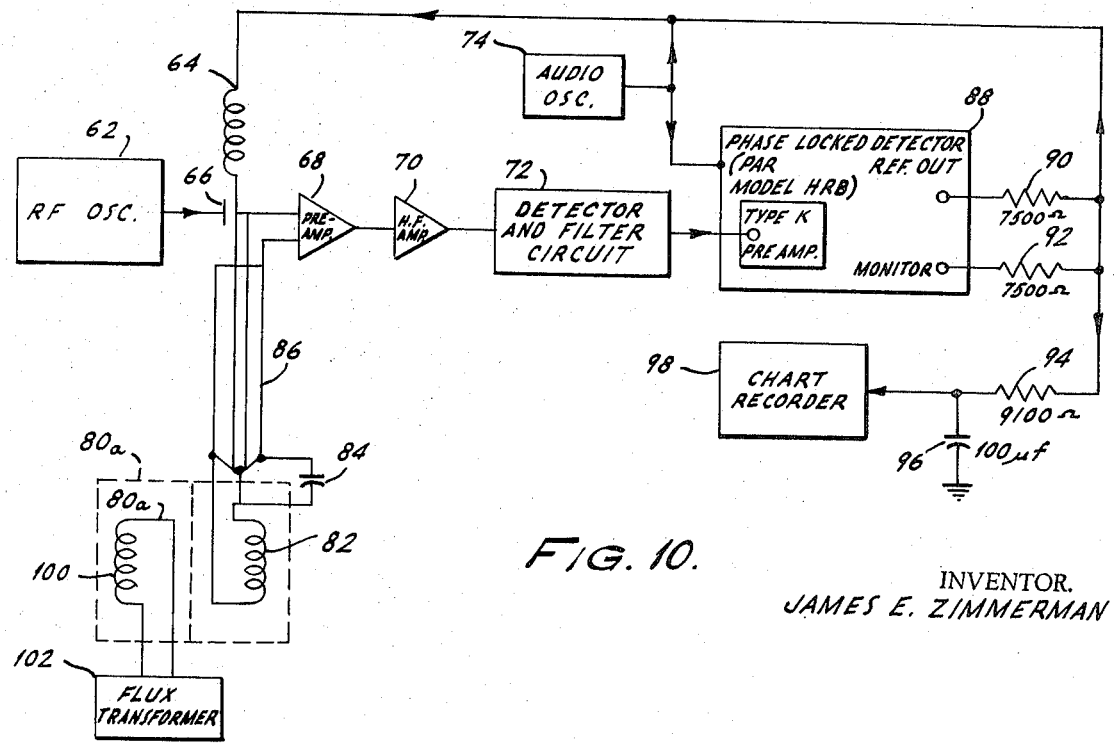
FIG. 10 is a block diagram of a magnetometer which incorporates a symmetric SQUID according to the invention.

By replacing the X-Y scope, in the circuit of FIG. 9, by a phase-locked detector and feeding the D.C. output of the phase-locked detector back to the SQUID, the system can be made to function as a lock-on magnetometer. The magnetometer circuit is shown in FIG. 10. Components similar to those of the FIG. 9 circuit are similarly numbered.

A suitable phase locked detector 88 is a Princeton Applied Research Model HR-8, having the functional characteristics shown in Table 2.

TABLE 2
SENS. 50 volts
FREQ. 95 Hz
PHASE ~ 0
SIG Q ~ 10
MODE INT.
TIME CONST. 3 SEC
REF ATTN.~2
METER MONITOR — OUT
ZERO OFFSET — 0

The phase locked detector output is coupled back to the tank circuit coil 82 of the SQUID by coupling resistors 90 and 92, choke 64, and coaxial cable 86. This output is also applied to chart recorder 98 by the low pass filtering network comprising resistor 94 and capacitor 96.

In operation, changes in external field which are sensed by the flux-transformer will cause the phase-locked detector to produce a D.C. output signal which is fed back to coil 82 to produce a field in the SQUID which tends to oppose the external field until the output of the phase detector is nulled. The change in field strength needed to oppose the external field is recorded on chart recorder 98 as the magnetometer output.

Figure 11:
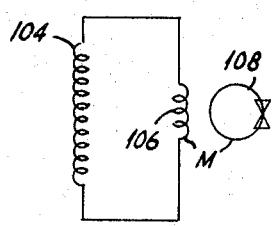
FIG. 11 is a schematic diagram of a flux transformer used in combination with a symmetric SQUID according to the invention to measure magnetic field strength.
Figure 12:
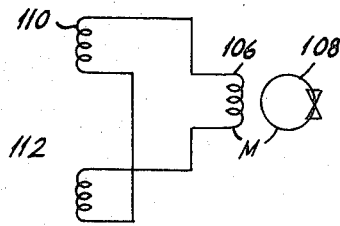
FIG. 12 is a schematic diagram of a flux transformer used in combination with said symmetric SQUID to measure magnetic field gradient.

The external field is applied to the symmetric SQUID 80a by inserting in the other hole of the SQUID a coil 100 which is coupled to flux transformer 102. The flux transformer-SQUID interconnection is represented schematically in FIG. 11. The flux transformer is a closed loop comprising a superconductive loop, represented schematically by coil 104, connected to coil 106. Coil 106 is inserted into one of the holes of symmetrical squid 108 thereby magnetically coupling the flux transformer in the SQUID by mutual inductance M. A gradient-sensitive flux transformer is shown schematically in FIG. 12. The external flux sensing portion of the gradient sensitive flux transformer is represented by two coils 110 and 112, of equal inductance, connected in series opposition. Thus, there is no response to a uniform applied field, but a current proportional to the gradient of the field will be induced. The gradient-sensitive flux transformer can be represented spatially as shown in FIG. 13, where the two external superconductive loops, 114 and 116, are aligned coaxially. The flux transformer responds to $\delta B_z/\delta z$, where z represents distance along the line through the center of the two loops, and $B_z$ represents the flux density of the external field as a function of z. The sensitivity of this device varies inversely with the distance between the sensing loops, $l$.

The gradient-sensitive flux transformer used in the preferred embodiment of the invention is shown in FIGS. 14 and 14A. The flux sensing superconductive loops, 120 and 124, are each formed by a single turn of thin niobium sheet wrapped on quartz tube 118. Connection to the SQUID is made by twisted niobium leads 122. These leads are connected to a flux sensing coil (not shown) which is inserted into one hole of the symmetric SQUID. The flux sensing coil comprises five turns of No. 36 (0.25 mm) niobium wire. The dimensions of the flux transformer of FIG. 14 are shown in Table 3.

TABLE 3

| DEVICE DIMENSION | SIZE millimeters |
|---|---|
| $f$ | 50 |

Field measurements were made with the apparatus shown in FIG. 15. The symmetric SQUID 144 was magnetically coupled from one hole to flux transformer 146, which is of the type shown in FIG. 14. The other hole of the SQUID was magnetically coupled to external electronic measuring circuitry 128 by coaxial cable 142. The SQUID-flux transformer combination was mounted in glass dewar 138 of about 2 liter capacity, which contained liquid helium 140. Dewar 138 was mounted in glass dewar 134 which contained liquid nitrogen 136. The entire cryogenic apparatus was mounted in cylindrical aluminum shield 132, to prevent interference from radio and radar apparatus. The shield must be placed symmetrically about the cryogenic apparatus to yield optimum results. The mounting apparatus (not shown) comprised non-metallic materials such as micarta sheets and nylon screws. Battery package 126 supplied power to electronic measuring circuitry 128. This circuitry was the same as that shown in FIG. 9, except for the addition of a gain-of-10-differential post detection amplifier (following detector and filter circuit 72 of FIG. 9). Chart recorder 130 was connected in parallel with the oscilloscope contained in circuitry 128.

The field measurements indicate sensitivities of the order of $10^{-10}$ gauss/cm. Sensitivities of better than $10^{-11}$ gauss/cm. have been theoretically predicted for this device.

OTHER APPLICATIONS OF THE SYMMETRIC SQUID

The symmetric SQUID can be used for sensitive measurement of temperature by inserting into one hole of the device a magnetic material whose susceptance varies with temperature. The device is then cooled to its superconducting state in the presence of a magnetic field. Once in the superconducting state, the flux lines will be trapped in the device and the external field can be removed. Then, as changes in temperature cause changes of susceptance of the magnetic material, flux lines will shift across the point contact of the device. The changes in the interference pattern of the device as a function of temperature, which can be measured by the circuitry heretofore described, will yield a sensitive measure of temperature.

In one embodiment of the invention, 6.6 milligrams of cerous magnesium nitrate (CMN) was inserted into one hole of the SQUID. A magnetic field of 300 gauss was applied to the SQUID by means of a coil wound around its outer cylindrical surface. The device was then cooled to 4.2°K. and then the applied field was removed. Interference pattern measurements, as a function of temperature, were made using the circuitry of FIG. 9. The results are shown in FIG. 16. The deviations from the straight line of FIG. 16 are accounted for by imprecision in measurements of phase shift and temperature. The inherent resolution of the symmetric SQUID as a temperature sensor has been computed to be of the order of $10^{-5}$ degrees. In a similar manner the device can be used to accurately measure susceptance of magnetic materials.

Figure 18:
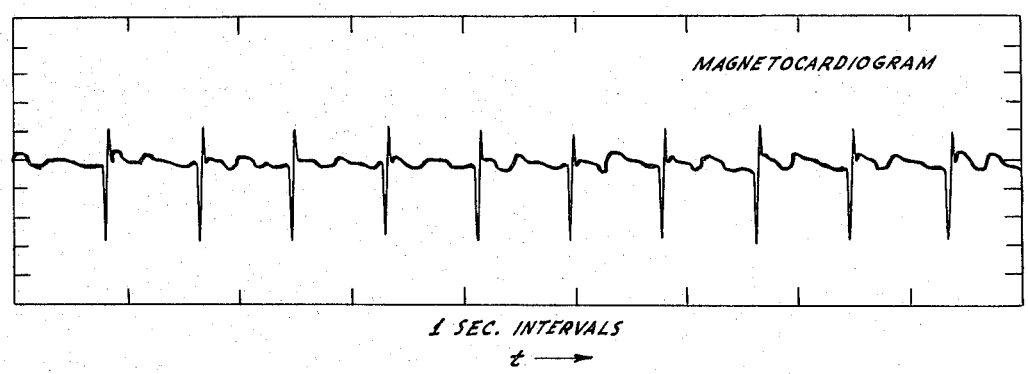
FIG. 18 depicts a magnetocardiogram taken with apparatus using the symmetric SQUID of the invention.
Figure 19:
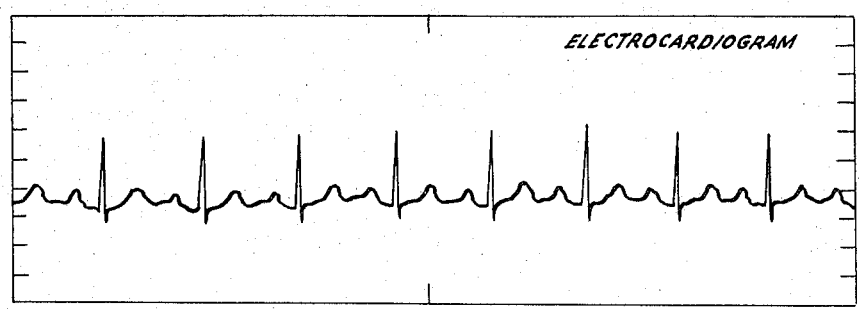
FIG. 19 depicts an electrocardiagram taken from the person from whom the magnetocardiogram of FIG. 19 was taken.

It will be apparent to those skilled in the art that the symmetric SQUID can be used as an ultrasensitive magnetometer in other applications, such as the examination of airlines passengers for metal objects or the measurement of the magnetic field associated with the human heart. For example, the device was used in a probe shown in FIG. 17 as part of a magnetocardiograph. The probe was connected to external electronic circuitry (not shown), similar to that shown in FIG. 9, by stainless steel coaxial cable 148. A 10-turn coil of copper wire 154 was positioned in one hole of SQUID 152 and coupled to coaxial cable 148 and tank circuit capacitor 150. Flux transformer 156, which was constructed of 0.25 millimeter niobium wire, was coupled to the other hole of the SQUID. The entire lower end of the probe was surrounded by mylar sleeve 158. The probe was positioned in front of the subject's chest. FIG. 18 shows the magnetocardiogram obtained from a human subject. It can be seen that the magnetocardiogram pattern compares favorably with the electrocardiogram, of the same subject, shown in FIG. 19. One advantage of the magnetocardiograph is that terminals need not be connected to the subject.

The symmetric SQUID can also be used as a detector of R.F. energy. In this application the device can be used to terminate a section of waveguide. When R.F. is applied to the waveguide its presence is detected as a change in impedance of the tank circuit used with the device. Alternatively, the R.F. signal to be detected can be applied to one end of the device while a local oscillator signal of slightly different frequency is applied to the other end of the device. The tank circuit can then be tuned to the difference between these two frequencies, to provide an I.F. pick off.

I claim:

1. A superconductive quantum interference device comprising:
   a body of superconductive material having a plurality of holes extending therethrough, said body further having wall structure defining an aperture extending through said body, said aperture connecting at least a pair of said holes, and a superconductive weak link connected across said aperture.

2. A superconductive device comprising:
   a rod of superconductive material having a hole extending longitudinally therethrough, the cross section of said hole having a dumbbell shape in the plane perpendicular to the longitudinal axis of said rod and being disposed symmetrically about said longitudinal axis; and
   first means for establishing a superconductive weak link across said hole.

3. The device of claim 2 wherein said first means is composed of the same superconductive material as said rod.

4. The device of claim 3 wherein said first means comprises means for establishing a point contact across the center of said hole.

5. The device of claim 3 wherein said first means comprises first and second screws threaded transversely through the center of said rod and meeting in the narrow portion of said dumbbell shaped hole.

6. The device of claim 5 wherein the end of said first screw which extends into said rod is pointed, and the end of said second screw which extends into said rod is flat.

7. The device of claim 6 wherein said first means additionally comprises second and third means for locking said first and second screws respectively into position.

8. The device of claim 7 wherein said second and third means are nuts.

9. The device of claim 8 wherein said superconductive material is selected from the group consisting of niobium, vanadium, and tantalum.

10. The device of claim 2 additionally comprising magnetic material in one of the circular portions of said dumbbell shaped hole; said magnetic material having a susceptance which varies with temperature.

11. The device of claim 10 additionally comprising a coil wound around the outer cylindrical surface of said rod.

12. The device of claim 10 wherein said magnetic material is cerous magnesium nitrate powder.

* * * * *

UNITED STATES PATENT OFFICE
CERTIFICATE OF CORRECTION

Patent No. 3,758,854  Dated September 11, 1973

Inventor(s) James E. Zimmerman

It is certified that error appears in the above-identified patent and that said Letters Patent are hereby corrected as shown below:

Column 4, line 30, change "sensing" to -- producing --.

Column 4, line 66, change "impedance" to -- resistance --.

Column 8, line 39, change "$\phi, 2$" to -- $\phi_0/2$ --.

Column 8, line 50, change "triagnular" to -- triangular --.

Column 10, line 36, after "M." start new paragraph.

Signed and sealed this 1st day of October 1974.

(SEAL)
Attest:

McCOY M. GIBSON JR.
Attesting Officer

C. MARSHALL DANN
Commissioner of Patents